INVENTOR
A. C. LONGTON
BY
Daniel V. De Simone
ATTORNEY

INVENTOR
A. C. LONGTON
BY Daniel V. De Simone
ATTORNEY 3,233,042

INTERCHANNEL CROSSTALK REDUCTION IN DUAL PROCESSING MULTICHANNEL PCM TRANSMITTERS

Albert C. Longton, North Andover, Mass., assignor to Bell Telephone Laboratories, Incorporated, New York, N.Y., a corporation of New York Filed Feb. 2, 1962, Ser. No. 170,679
2 Claims. (Cl. 179—15)

This invention relates to time division multiplex systems employing PCM (pulse code modulation). More specifically, the invention concerns PCM transmitters in which analogue message samples are converted to a binary pulse code.

Although the advantages are many, one of the disadvantages of PCM systems which operate on a time sharing basis is interchannel crosstalk. Interchannel crosstalk occurs whenever the signals of one channel appear as interference in another channel.

United States Patent 3,073,904, which issued January 15, 1963, to C. G. Davis, concerns a "dual-processing" PCM system in which two groups of channels are processed into code alternately over separate paths and then interleaved for transmission to receivers. The object of dual processing is to reduce interchannel crosstalk.

It is to a further reduction of interchannel crosstalk that the present invention is directed.

In accordance with the invention, a synchronous clamp circuit is used to prevent interchannel crosstalk in each of the twin volume-range compressors of a dual processing PCM system. The compressors are alternately idle. The clamp circuit comprises a diode bridge which is connected across the sample storage input of each compressor. A clamp drive circuit, which includes a blocking oscillator, renders this bridge connection a short circuit during the intervals of idleness of its associated compressor. Each sample storage circuit is thus always cleansed of lingering sample energy before receiving a new message sample. Interchannel crosstalk at the compressors is thereby avoided.

The invention will be better understood after we have considered it in the context of an illustrative embodiment.

Figure 1:
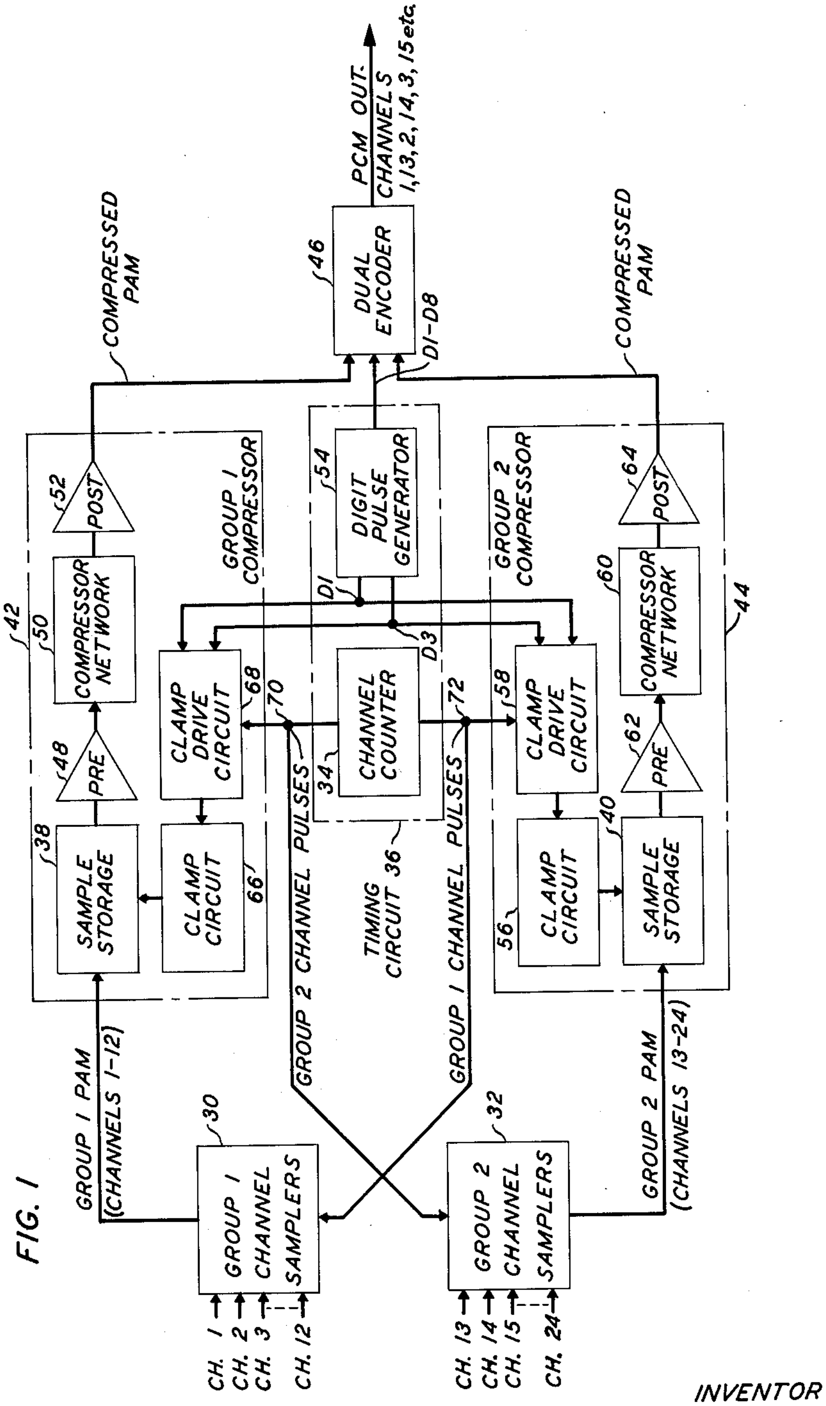
FIG. 1 is a block diagram illustrating the manner in which the crosstalk-reducing feature of the invention is applied in a dual-processing PCM transmitter.

In FIG. 1, two groups of channels are each sampled sequentially in separate channel samplers 30 and 32. These channels each accommodate a message source (not shown)—for example, a telephone channel. The samplers 30 and 32 operate under the control of the channel counter 34, which is part of the timing circuit 36. The operation of the timing circuit 36 and the samplers 30, 32 is well known. See, for example, R. L. Carbrey Patent No. 2,610,295, issued September 9, 1952 and W. M. Goodall Patent No. 2,449,467, issued September 14, 1948.

The channel counter 34 enables the individual gates of the samplers 30 and 32 alternately and in sequence so that the channel sequence is 1, 13, 2, 14, 3, 15, 4, 16 . . . 11, 23, 12, 24. Samples (which may be zero-valued) are thereby derived from the twenty-four message sources (not shown) and stored in their respective sample storage circuits 38 and 40 in the time sequence named. In FIG. 1, the samples from channels 1–12 are called Group 1 PAM (pulse amplitude modulation) and those from channels 13–24 are called Group 2 PAM.

These PAM samples pass on to their respective compressors wherein their amplitudes are modified so that quantizing noise is minimized. As to this function of compressors, see, for example, Patent No. 3,016,528, which issued to C. P. Villars on January 9, 1962.

The Group 1 compressor 42 and the Group 2 compressor 44 are arranged to process their respective channel groups separately. Since these compressors are alike, it is sufficient to note the operation of one of them.

In the Group 1 compressor 42, for example, the sample storage circuit 38 stores samples received from the Group 1 channel samplers 30 so that each of these samples will exist for at least one encoding interval, the time required for the encoder 46 to convert a PAM sample to pulse code. The arrangement of the compressor 42 is orthodox. (See G. Crisson Patent No. 1,737,820, which issued December 3, 1929, and the multitudinous progeny thereof.) It comprises—in addition to the sample storage circuit 38—the preamplifier 48, the compressor network 50, and the post amplifier 52. The compressor network 50, which traditionally consists of diodes and resistors, is a nonlinear network that compresses the dynamic range of the PAM samples it receives. The amplifiers 48 and 52 simply adjust power and impedance levels to appropriate values.

The amplifier 52 supplies the compressed PAM samples to the encoder 46, which may be of the type disclosed in the above-cited Davis patent. The encoder 46 weighs each sample against a succession of reference currents to determine its amplitude and conforms this amplitude to the nearest of 127 quantum levels. The 127 levels correspond to the various combinations of the seven binary message digits that Davis employs. Each of these levels is therefore represented by seven consecutive digits, each of which we shall assume may be a pulse or a space. To these message digits is added an eighth digit for purposes of supervisory signaling. Consequently, each code word consists of eight digits. These digits are timed by the digit timing pulses D1–D8, which are supplied to the encoder 46 by the digit pulse generator 54.

The arrangement of FIG. 1 is consonant with the dual encoding scheme of the Davis patent. This arrangement, in order to reduce interchannel crosstalk, provides a full channel period of guard interval between each PAM sample.

Now, in accordance with the invention, interchannel crosstalk is reduced still further by the clamp circuit 66, which, in response to the clamp drive circuit 68 (in turn responsive to the timing circuit 36), obliterates all vestiges of sample energy in the Group 1 sample storage 38 whenever the Group 2 compressor is active and the Group 1 compressor is idle. The sequence of obliteration, or erasure, is evident if we note that the Group 2 channel pulses govern the Group 1 clamp drive circuit 68, while the Group 1 channel pulses govern the Group 2 clamp drive circuit 58. Thus, whenever Group 2 channel pulses operate the Group 2 channel samplers 30, they also initiate the cleansing of the Group 1 sample storage 38.

The Group 2 compressor 44, as we have noted, is the twin of the Group 1 compressor 42. Thus, the clamp circuit 56, the clamp drive circuit 58, the sample storage circuit 40, the compressor network 60, and the amplifiers 62 and 64 all have their counterparts in the Group 1 compressor 42. So much for the broad-brush treatment afforded by FIG. 1. We proceed now to the detailed schematic circuit of FIG. 2.

Figure 2:
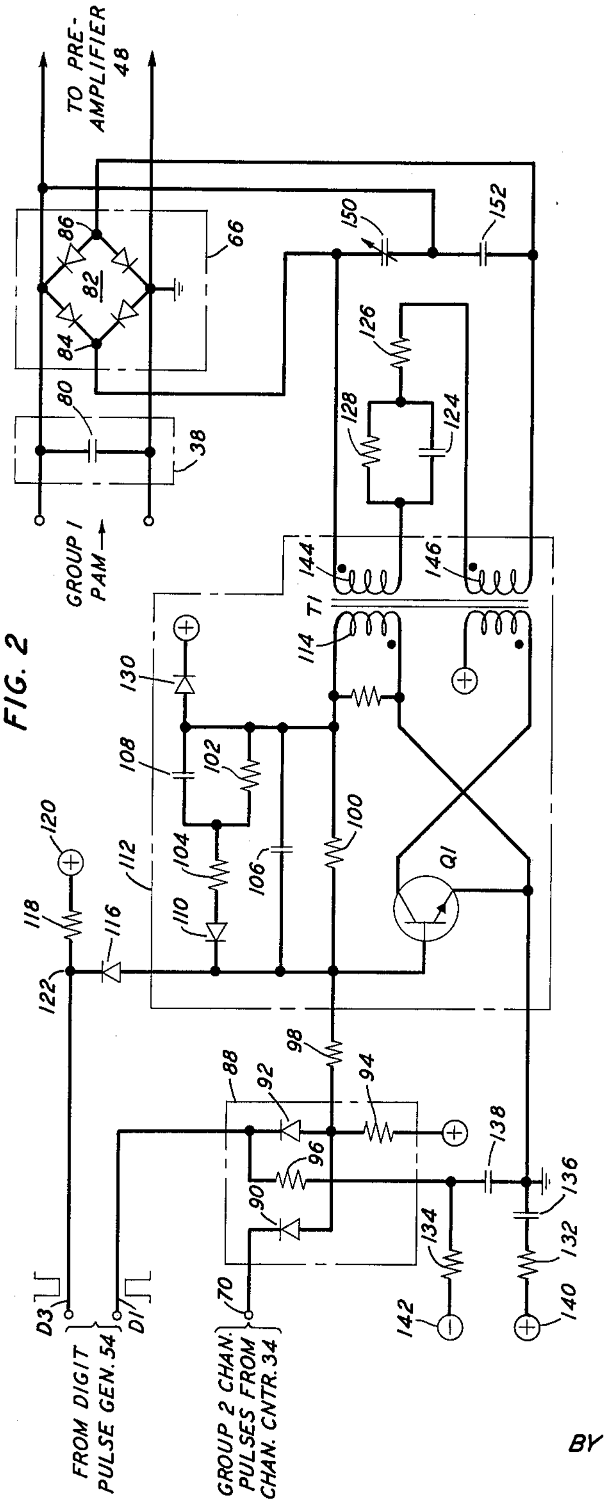
FIG. 2 is a schematic diagram of a crosstalk-reducing circuit arranged in accordance with the invention.

FIG. 2 shows the clamp circuit 66 and the clamp drive circuit 68 of FIG. 1 in detail. The clamp circuit 66, by its switching action, removes the stored energy of each channel sample after its information has been absorbed (i.e., transformed to code) and thus prepares the sample storage 38 for exclusive storage of the next sample. Interference by any "hangover" sample energy is thereby avoided. In FIG. 2, the sample storage 38 of FIG. 1 is shown to consist simply of a capacitor 80. We may note in passing that like elements are identified by the same reference characters in FIGS. 1 and 2.

Voltages stored on the capacitor 80 are discharged to ground through the diode bridge 82, which in effect is a normally open switch, whenever a switching pulse is applied across the terminals 84 and 86. The switching pulse closes the switch (forward biases the diodes of the bridge 82) so that a low impedance path is provided to ground for energy stored on the capacitor 80. Switching pulses are applied across the terminals 84 and 86 during idle intervals of the Group 1 compressor, i.e., during the Group 2 channel intervals 13, 14, 15 . . . 24.

The diodes 90 and 92 and the resistors 94 and 96 form an AND gate 88. This gate supplies a positive bias current to the resistor 98 whenever there is a coincidence of D1 digit timing pulse and a Group 2 channel pulse at the cathodes of the diodes 92 and 90, respectively.

The transistor Q1, the transformer T1, and the feedback network consisting of the resistors 100, 102, and 104, the capacitors 106 and 108, and the diode 110 comprise a blocking oscillator 112, which forms the basis for copending application Serial No. 163,305, filed December 29, 1961, by N. E. Lentz.

The postive current from the AND gate 88 at time D1, which is established by the D1 digit timing pulse, flows through the resistor 98 to the base of Q1 and turns Q1 ON. This ON condition of the transistor Q1 is maintained by positive feedback from winding 114 of T1, through the feedback network, which was described above, to the base of Q1. The resistor 98 is of sufficient ohmic value to prevent the input AND gate 88 from excessively diverting the current fed back ot the base of Q1. However, when a D3 digit timing pulse (negative) appears at the diode switch 116, this feedback current is diverted from the base of the transistor Q1 and the blocking oscillator 112 is thus turned OFF. The resistor 118 clamps the juncture 122 to the potential source 120 so that, when the negative D3 timing pulse is absent, the diode 116 is reverse-biased.

We should note that the pulses D1 and D3 and the Group 2 channel pulses recur periodically. Consequently, the blocking oscillator 112 is turned ON and OFF periodically. During the first few cycles of the operation of the blocking oscillator 112, the conditions manifest therein are different from those manifest when the oscillator is running normally. For during the first few cycles of operation, the capacitor 124 must be charged. A low-impedance load is therefore presented to the transistor Q1, which must supply high current as a result.

To deliver this high starting current, the feedback network of the transistor Q1 is designed to provide greater positive feedback during the first few cycles of operation than it does when normalcy is achieved. During the first cycle of operation, the AND gate 88 having been enabled for the first time, the charge on the capacitor 108 is zero. Maximum feedback is therefore applied through the resistor 104 and the diode 110 to the base of the transistor Q1. The feedback current places a charge on the capacitor 108 which is proportional to the charge placed on the capacitor 124.

As the charge on the capacitor 124 increases in the succeeding cycles, the load current of the transistor Q1 decreases. The current fed back to the base of Q1 decreases, since the accumulating charge on the capacitor 108 reduces that portion of the feedback voltage which appears across the resistor 104.

The charge time of the resistor 104 and the capacitor 108 is slightly longer than the charge time of the capacitor 124 and the combined resistance of the resistor 126 and the diode bridge 82. Consequently, the period of increased feedback around the transistor Q1 is slightly longer than the charge period of the capacitor 124.

The discharge time of the capacitor 108 through resistor 102 is slightly less than the discharge time of the capacitor 124 through the resistor 128. The feedback circuit of the transistor Q1 is thus restored to its start condition more rapidly than is the load circuit of the transformer T1. This permits rapid recovery on momentary failures.

The resistor 100 and the capacitor 106 provide normal feedback during the output pulse rise time of the blocking oscillator 112. The diode 130 limits the feedback voltage on winding 114 and, via coupling through transformer T1, prevents the collector swing of the transistor Q1 from going to zero volts. This prevents saturation of the transistor. The two positive voltage sources in blocking oscillator 112 are, it should be noted, a single source. They are shown separately only to avoid cluttering the drawing unnecessarily.

The resistors 132 and 134 and the capacitors 136 and 138 serve as filters for decoupling the power supplies 140 and 142. The resistor 132 also limits the average current through the transistor Q1 to a safe value should the transistor ever remain in an On condition.

The output pulse of the blocking oscillator 112 at windings 144 and 146 of the transformer T1 is connected through resistors 128 and 126 and the capacitor 124 across the diode bridge 82. The diode bridge 82 rectifies these output pulses and produces a direct voltage across the capacitor 124. The resistor 126 limits the peak secondary current of the transformer T1 to a value that will not overload the blocking oscillator 112 during its first few cycles of operation.

Figure 3:
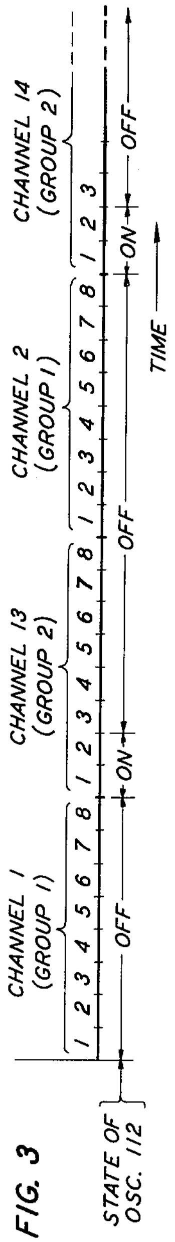
FIG. 3 is a timing diagram.

The blocking oscillator 112, we may note from a perusal of the timing diagram of FIG. 3, is in its ON state only one-eighth of the time; for we have assumed 8 time slots per channel (established by the digit time pulses D1–D8) and the blocking oscillator 112 can only go ON at the first time slot of every other channel in view of AND gate 88. Now, since the digit timing pulse D3 turns the blocking oscillator 112 OFF, the oscillator is ON for 2 time slots out of 16 (2 channels) or one-eighth of the time.

When the blocking oscillator 112 is turned ON, the diodes of the diode bridge 82 are rendered conductive. When these diodes are conducting, the charge on the sample storage capacitor 80 flows to ground through their low forward impedance. Any hangover sample energy is thus erased. However, when these diodes are reversed-biased no current flows from the capacitor 80 to ground.

We may note that the timing diagram of FIG. 3 shows but a portion of the channel sequence. It begins with the Group 1 channel 1, during which time the Group 1 oscillator 112 (FIG. 2) is turned OFF, for the Group 1 compressor 42 (FIG. 1) is then operative (i.e., it may then be receiving samples). This compressor is idle (meaning that it cannot receive samples), however, during the next channel—channel 13 of Group 2. And so the sequence goes.

The capacitor 150 is adjustable so that the sum of its capacitance and the stray capacitance to the upper end of the secondary coil 144 may be adjusted to equal the sum of the capacitance of the capacitance 152 and the stray capacitance to the lower end of the secondary coil 146. This equalization of capacitances prevents the output pulse of the blocking oscillator 112 from causing any spurious charge to be accumulated on the storage capacitor 80.

The spirit and scope of the invention should not be deemed limited by the illustrative embodiment which has been described.

What is claimed is:

1. In a pulse code transmitter, apparatus for erasing message samples from a pair of sample storage circuits whenever said circuits are idle, each of said storage circuits being alternately idle and receptive to message samples while, concurrently, the other is alternately receptive to message samples and idle, comprising means for timing the periods of idleness and receptiveness of said sample storage circuits, a pair of diode bridges each connected across a respective one of said sample storage circuits, each of said storage circuits being cleansed of sample energy whenever its respective diode bridge is biased into conductivity, a pair of blocking oscillators each of which has a feedback circuit which includes a resistance-capacitance network having a predetermined charge time, each of said blocking oscillators having a conducting state and a non-conducting state, a pair of transformers each connecting one of said blocking oscillators across a respective one of said diode bridges, each of said blocking oscillators biasing its respective diode bridge into conductivity when it is in its conducting state and each of said transformers having a secondary winding to which a respective resistance-capacitance network is connected, the resistance-capacitance networks connected to said transformer secondary windings having charge times less than those of the resistance-capacitance networks in the feedback circuits of said blocking oscillators, a separate pair of capacitors each connected in series across a respective one of said transformer secondary windings, the common point between each pair of capacitors being connected to the respective sample storage circuit and diode bridge and the total capacitance between the common point between each pair of capacitors and one side of the respective one of said transformer secondary windings being equal to the total capacitance between said common point and the other side of the respective one of said transformer secondary windings, and means responsive to said timing means for triggering each of said blocking oscillators into its conductive state during periods of idleness of its respective sample storage circuit.

2. In a pulse code transmitter, apparatus for erasing message samples from a pair of sample storage circuits whenever said circuits are idle, each of said storage circuits being alternately idle and receptive to message samples while, concurrently, the other is alternately receptive to message samples and idle, comprising means for timing the periods of idleness and receptiveness of said sample storage circuits, a pair of diode bridges each connected across a respective one of said sample storage circuits, each of said storage circuits being cleansed of sample energy whenever its respective diode bridge is biased into conductivity, a pair of blocking oscillators each of which has a feedback circuit which includes a resistance-capacitance network having predetermined charge and discharge times, each of said blocking oscillators having a conducting state and a non-conducting state, a pair of transformers each connecting one of said blocking oscillators across a respective one of said diode bridges, each of said blocking oscillators biasing its respective diode bridge into conductivity when it is in its conducting state and each of said transformers having a secondary winding to which a respective resistance-capacitance network is connected, the resistance-capacitance networks connected to said transformer secondary windings having charge times less and discharge times greater than those of the resistance-capacitance networks in the feedback circuits of said blocking oscillators, and means responsive to said timing means for triggering each of said blocking oscillators into its conductive state during periods of idleness of its respective sample storage circuit.

References Cited by the Examiner

UNITED STATES PATENTS

| | | | |
|---|---|---|---|
| 2,603,714 | 7/1952 | Meacham | 179—15 |
| 2,636,081 | 4/1953 | Feldman | 325—39 |
| 2,979,570 | 4/1961 | Brightman | 179—15 |
| 3,071,701 | 1/1963 | Perreault | 307—88.5 |

DAVID G. REDINBAUGH, *Primary Examiner.*